United States Patent
Arakawa et al.

(10) Patent No.: US 10,088,682 B2
(45) Date of Patent: Oct. 2, 2018

(54) IMAGE PROJECTION DEVICE AND PROJECTION DEVICE

(71) Applicants: QD LASER, INC., Kanagawa (JP); THE UNIVERSITY OF TOKYO, Tokyo (JP)

(72) Inventors: Yasuhiko Arakawa, Tokyo (JP); Mitsuru Sugawara, Kawasaki (JP); Makoto Suzuki, Kawasaki (JP)

(73) Assignees: QD LASER, INC., Kawasaki-shi (JP); THE UNIVERSITY OF TOKYO, Tokyo (JP)

(*) Notice: Subject to any disclaimer, the term of this patent is extended or adjusted under 35 U.S.C. 154(b) by 0 days.

(21) Appl. No.: 14/893,278

(22) PCT Filed: Apr. 25, 2014

(86) PCT No.: PCT/JP2014/061753
§ 371 (c)(1),
(2) Date: Nov. 23, 2015

(87) PCT Pub. No.: WO2014/192479
PCT Pub. Date: Dec. 4, 2014

(65) Prior Publication Data
US 2016/0103324 A1    Apr. 14, 2016

(30) Foreign Application Priority Data

May 31, 2013  (JP) ................................. 2013-116330
Nov. 7, 2013  (JP) ................................. 2013-231565
Jan. 31, 2014  (JP) ................................. 2014-017556

(51) Int. Cl.
G09G 5/00        (2006.01)
G02B 27/01       (2006.01)
(Continued)

(52) U.S. Cl.
CPC ....... *G02B 27/0172* (2013.01); *G02B 26/101* (2013.01); *G02B 27/0101* (2013.01);
(Continued)

(58) Field of Classification Search
None
See application file for complete search history.

(56) References Cited

U.S. PATENT DOCUMENTS 6,227,667 B1    5/2001  Halldorsson
8,398,242 B2 *  3/2013  Yamamoto ........... G02B 26/101
                                                        345/8
(Continued)

FOREIGN PATENT DOCUMENTS

CN    101896851 A    11/2010
CN    102004316 A    4/2011
(Continued)

OTHER PUBLICATIONS

International Search Report for International Application No. PCT/JP2014/061753 dated Jul. 22, 2014.
(Continued)

*Primary Examiner* — Joseph Haley
(74) *Attorney, Agent, or Firm* — Kratz, Quintos & Hanson, LLP

(57) ABSTRACT

The present invention is an image projection device that includes: a light source 12 that emits a laser beam 34; a scanning mirror 14 that two-dimensionally scans the laser beam 34 emitted from the light source 12; and a projection mirror 24 that projects scanned light onto a retina 26 of an eyeball 22 of a user to project an image onto the retina 26, the scanned light being composed of the laser beam 34 that has been scanned by the scanning mirror 14, wherein the laser beam 34 emitted from the light source 12 is scanned by using a part of an operating range of the scanning mirror 14.

14 Claims, 16 Drawing Sheets

(51) Int. Cl.
*H04N 3/30* (2006.01)
*H04N 5/66* (2006.01)
*G09G 3/02* (2006.01)
*G02C 11/00* (2006.01)
*G09G 5/10* (2006.01)
*H04N 9/31* (2006.01)
*G02B 26/10* (2006.01)

(52) U.S. Cl.
CPC ............ *G02C 11/10* (2013.01); *G09G 3/025* (2013.01); *G09G 5/10* (2013.01); *H04N 3/30* (2013.01); *H04N 5/66* (2013.01); *H04N 9/3179* (2013.01); *G02B 26/105* (2013.01); *G02B 2027/011* (2013.01); *G02B 2027/0178* (2013.01)

(56) References Cited

U.S. PATENT DOCUMENTS

| | | | |
|---|---|---|---|
| 2006/0192094 | A1 | 8/2006 | Taniguchi |
| 2008/0151185 | A1 | 6/2008 | Saito et al. |
| 2008/0212195 | A1 | 9/2008 | Yamamoto |
| 2009/0316115 | A1 | 12/2009 | Itoh |
| 2010/0097580 | A1 | 4/2010 | Yamamoto |
| 2011/0012874 | A1* | 1/2011 | Kurozuka ............ G02B 26/105 345/204 |
| 2011/0051076 | A1 | 3/2011 | Sugihara |
| 2011/0122101 | A1 | 5/2011 | Kurozuka |
| 2014/0139404 | A1* | 5/2014 | Takeda ............... G02B 27/0172 345/8 |

FOREIGN PATENT DOCUMENTS

| | | |
|---|---|---|
| JP | H11-64782 | 3/1999 |
| JP | H11-295647 | 10/1999 |
| JP | 2000-515645 | 11/2000 |
| JP | 2006-235274 A1 | 9/2006 |
| JP | 2009-258686 A1 | 11/2009 |
| JP | 2010-91944 A1 | 4/2010 |
| JP | 2010-262232 A1 | 11/2010 |
| JP | 2011-53367 A1 | 3/2011 |
| JP | 2011-191454 A1 | 9/2011 |
| JP | 2011-203508 A1 | 10/2011 |
| JP | 2012-78533 A1 | 4/2012 |
| JP | 2013-44779 A1 | 3/2013 |
| JP | 2014-102368 A1 | 6/2014 |
| JP | 2014-228805 A1 | 12/2014 |
| WO | WO 2009/066475 A1 | 5/2009 |
| WO | 2009/133698 A1 | 11/2009 |
| WO | WO 2010/044205 A1 | 4/2010 |

OTHER PUBLICATIONS

European Patent Application No. 14804667.5: Extended European Search Report dated Mar. 21, 2017.

Chinese Patent Application No. 201480031121.0: First Notification of Office Action dated Feb. 22, 2017.

European Patent Application No. 14804667: Partial Supplementary European Search Report dated Dec. 21, 2016.

Japanese Patent Application No. 2014-017556: Notification of Reasons for Refusal dated Jun. 27, 2017.

* cited by examiner

IMAGE PROJECTION DEVICE AND PROJECTION DEVICE

TECHNICAL FIELD

The present invention relates to an image projection device and a projection device, and more particularly relates to, for example, an image projection device that projects an image onto the retina of a user and, for example, a projection device that projects a laser beam onto the eyeball of a user.

BACKGROUND ART

There has been known an image projection device that projects a laser beam onto the retina of a user while scanning the laser beam to allow the user to recognize the residual image of the scanned laser beam over the retina as an image. Such an image projection device is strongly required to be smaller. Thus, there has been suggested an image projection device that uses, for example, a laser diode to reduce the size and electrical power consumption thereof. Additionally, there has been suggested an image projection device that uses a low-power laser diode for the safety of the eyes of the user (e.g., Patent Document 1).

PATENT DOCUMENT

Patent Document 1: Japanese Patent Application Publication No. 11-64782

SUMMARY OF THE INVENTION

Problem to be Solved by the Invention

Since the eyeball of the user moves, the scanned laser beam may become not projected onto the retina, and thereby the user may not recognize an image. Even when all of the scanned laser beam is projected onto the retina and the user can recognize the entire image, the user may recognize a distorted image. Furthermore, the beam spot size of the laser beam projected onto the retina increases, and thereby a somewhat defocused image may be obtained.

When a projection mirror is located on the eyeball side surface of the lens of glasses and is used to project the laser beam onto the eyeball of the user, it may be difficult to achieve both the function as a projection mirror and the function as a lens of glasses.

The present invention has been made in the view of the above problems, and aims to provide an image projection device capable of providing a good image to the user, or a projection device capable of achieving both the function as a projection mirror and the function as a lens of glasses.

Means for Solving the Problem

The present invention is an image projection device characterized by including: a light source that emits a laser beam; a scanning unit that two-dimensionally scans the laser beam emitted from the light source; and a projection mirror that projects scanned light onto a retina of an eyeball of a user to project an image onto the retina, the scanned light being composed of the laser beam that has been scanned by the scanning unit, wherein the laser beam emitted from the light source is scanned by using a part of an operating range of the scanning unit. The present invention can provide a good image to a user.

In the aforementioned configuration, the laser beam emitted from the light source may be scanned in different positions within the operating range of the scanning unit in accordance with a move of the eyeball of the user.

In the aforementioned configuration, a controller that generates corrected image data by gradually changing height of an image of input image data from a first vertical side to a second vertical side and gradually changing curvature of the image from the first vertical side to the second vertical side may be provided, and the laser beam may be emitted from the light source based on the corrected image data.

In the aforementioned configuration, a controller that generates corrected image data by rotating an image of input image data and gradually changing curvature of the image from a first vertical side to a second vertical side may be provided, the scanning unit of which a scanning amplitude in a horizontal direction gradually changes in a vertical direction may be rotated to be used, and the laser beam may be emitted from the light source based on the corrected image data.

In the aforementioned configuration, the scanned light may be converged at a side of the retina beyond a pupil of the eyeball of the user by the projection mirror.

In the aforementioned configuration, the projection mirror may have a free curved surface, or have a compositional structure of a free curved surface and a diffraction surface.

In the aforementioned configuration, an optical means that allows a laser beam in the scanned light to enter the projection mirror as a diverging beam may be provided.

In the aforementioned configuration, the laser beam in the scanned light projected by the projection mirror may enter the eyeball as a light beam that is focused near the retina of the eyeball by a crystalline lens of the eyeball of the user.

The present invention is an image projection device characterized by including: a light source that emits a laser beam; a scanning unit that two-dimensionally scans the laser beam emitted from the light source; a projection mirror that converges scanned light near a pupil of an eyeball of a user, and then projects the scanned light onto a retina of the eyeball of the user to project an image onto the retina, the scanned light being composed of the laser beam that has been scanned by the scanning unit; and an optical means that allows a laser beam in the scanned light to enter the projection mirror as a diverging beam. The present invention can provide a good image to a user.

In the aforementioned configuration, the laser beam in the scanned light projected by the projection mirror may enter the eyeball as a light beam that is focused near the retina of the eyeball by a crystalline lens of the eyeball of the user.

In the aforementioned configuration, the projection mirror may include a lens of glasses located in front of the eyeball of the user, the lens may include a first lens portion and a second lens portion located in this order from a side of the eyeball of the user, and a diffraction element located between the first lens portion and the second lens portion, and the scanned light composed of the laser beam may enter the first lens portion from the side of the eyeball of the user, and is then reflected at an opposite surface of the second lens portion from the eyeball of the user to be projected onto the retina of the eyeball of the user.

The present invention is a projection device characterized by including: a light source that emits a laser beam; and a projection mirror that includes a lens of glasses located in front of an eyeball of a user, and projects the laser beam onto the eyeball of the user, wherein the lens includes a first lens portion and a second lens portion located in this order from a side of the eyeball of the user, and a diffraction element located between the first lens portion and the second lens portion, and the laser beam enters the first lens portion from the side of the eyeball of the user, and is then reflected at an opposite surface of the second lens portion from the eyeball of the user to be projected onto the eyeball of the user. The present invention can achieve both a function as a projection mirror and a function as a lens of glasses.

Effects of the Invention

The present invention can provide a good image to a user. Or, the present invention can achieve both a function as a projection mirror and a function as a lens of glasses.

EMBODIMENTS FOR CARRYING OUT THE INVENTION

Hereinafter, a description will be given of embodiments of the present invention with reference to the drawings.

First Embodiment

Figure 1A:
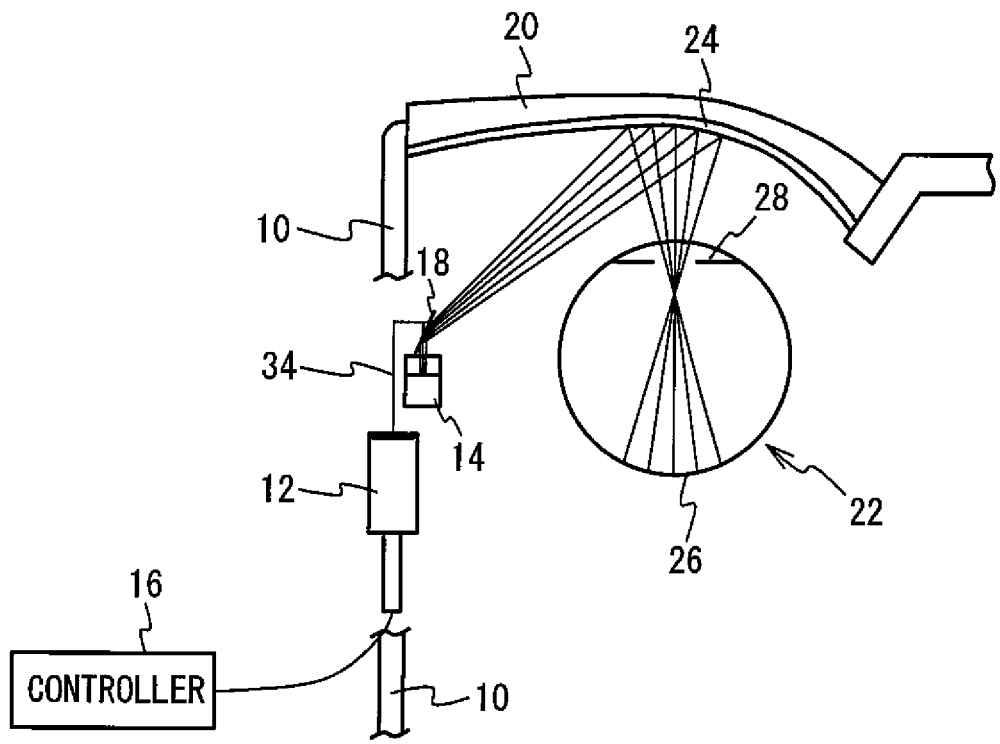
FIG. 1A illustrates an image projection device in accordance with a first embodiment viewed from above.
Figure 1B:
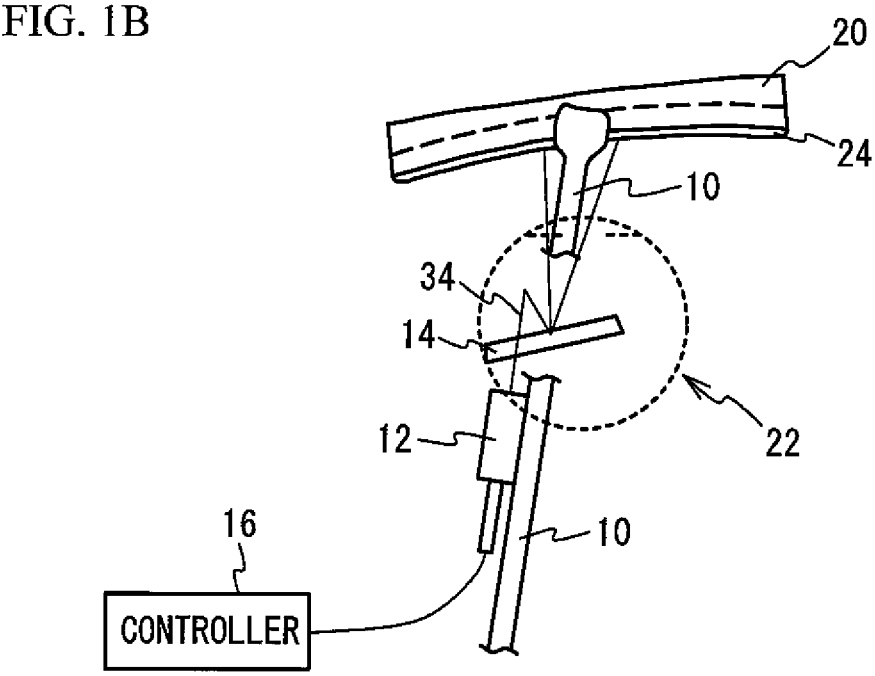
FIG. 1B illustrates the image projection device viewed from the side.

FIG. 1A illustrates an image projection device in accordance with a first embodiment viewed from above, and FIG. 1B illustrates the image projection device viewed from the side. In FIG. 1B, a part of a laser beam 34 is not illustrated for clarity of illustration. As illustrated in FIG. 1A and FIG. 1B, a temple 10 of glasses includes a light source 12 that emits the laser beam 34, and a scanning mirror 14 that functions as a scanning unit that two-dimensionally scans the laser beam 34 emitted from the light source 12. The light source 12 emits a laser beam of a single wavelength or a laser beam of different wavelengths. A lens and a mirror are used to allow the laser beam 34 emitted from the light source 12 to enter the scanning mirror 14, but they are not illustrated.

A controller 16 controls the emission of the laser beam 34 from the light source 12 based on input image data. That is to say, the light source 12 converts an image signal to a laser beam. The controller 16 may not be located in the glasses but may be located in an external device, or may be located in the temple 10 of the glasses. Here, the controller 16 is located in an external device (e.g., a mobile terminal) as an example.

The scanning mirror 14 scans the laser beam 34 emitted from the light source 12 to use it as projection light for projecting an image onto the retina 26 of an eyeball 22 of the user. The scanning mirror 14 is, for example, a MEMS (Micro Electro Mechanical Systems) mirror, and scans the laser beam in horizontal and vertical directions.

The laser beam 34 that has been scanned by the scanning mirror 14 (scanned light) is reflected toward a lens 20 of the glasses by a mirror 18. A projection mirror 24 is located on the surface, located at the eyeball 22 side of the user, of the lens 20. The projection mirror 24 projects the laser beam 34 that has been scanned by the scanning mirror 14 (scanned light) onto the retina 26 of the eyeball 22 to project an image onto the retina 26. That is to say, the user can recognize the image by the residual image effect of the laser beam projected onto the retina 26. The projection mirror 24 is designed so that the convergence position of the laser beam 34 that has been scanned by the scanning mirror 14 (scanned light) is at the retina 26 side beyond a pupil 28 of the eyeball 22.

When the light source 12 emits a laser beam of a single wavelength, the projection mirror 24 may be a single-layer half mirror having a free curved surface or a compositional structure of a free curved surface and a diffraction surface. By using the projection mirror 24 that has a free curved surface, the laser beam 34 that has been scanned by the scanning mirror 14 can be projected onto the retina 26 of the eyeball 22 even when the position of the scanning mirror 14 located in the temple 10 of the glasses deviates from the position of the eyeball 22 in the height direction. By using the projection mirror 24 that has a compositional structure of a free curved surface and a diffraction surface, the laser beam 34 that has been scanned by the scanning mirror 14 can be reflected at a steeper angle.

However, when the light source 12 emits a laser beam of different wavelengths such as a red laser beam, a green laser beam, and a blue laser beam, the user may not recognize a good image when a single-layer half mirror having a compositional structure of a free curved surface and a diffraction surface is used. This is because, since the diffraction angle changes with respect to each wavelength, the convergence positions of the red laser beam, the green laser beam, and the blue laser beam greatly deviate from each other, and thereby the projection positions of them onto the retina 26 deviate from each other. The wavelength of the red laser beam ranges from 610 to 660 nm, the wavelength of the green laser beam ranges from 515 to 540 nm, and the wavelength of the blue laser beam ranges from 440 to 460 nm, for example. The example of the light source emitting the red, green, and blue laser beams is a light source in which laser diode chips of RGB (Red, Green, and Blue), a three color multiplexer, and a micro collimator lens are integrated.

Figure 2:
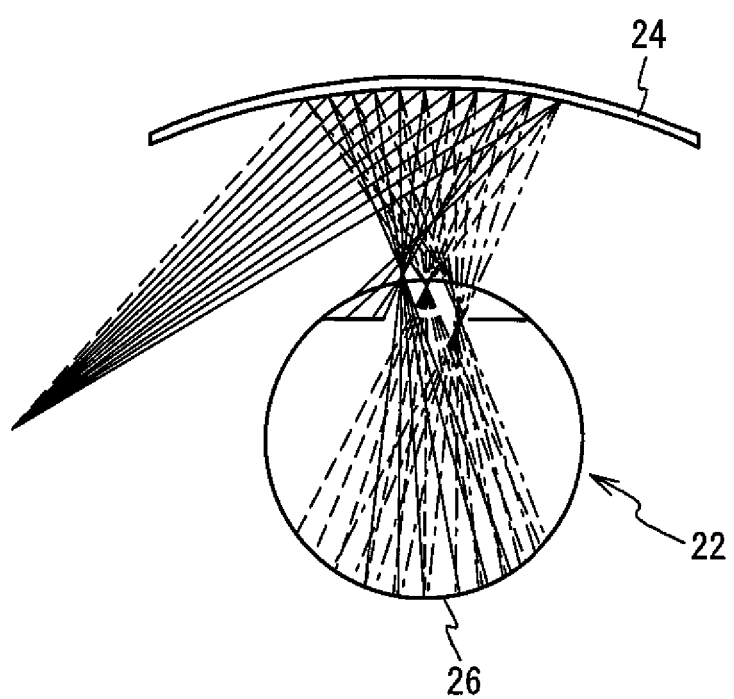
FIG. 2 illustrates the projections of red, green, and blue laser beams by a projection mirror using a single-layer half mirror having a compositional structure of a free curved surface and a diffraction surface.

FIG. 2 illustrates the projections of the red, green, and blue laser beams by the projection mirror 24 using a single-layer half mirror having a compositional structure of a free curved surface and a diffraction surface. In FIG. 2, the red laser beam is indicated by the solid line, the green laser beam is indicated by the dashed line, and the blue laser beam is indicated by the chain line. As illustrated in FIG. 2, the diffraction angles at the projection mirror 24 of the red, green, and blue laser beams differ from each other. Thus, the convergence positions of the red, green, and blue laser beams greatly differ from each other. For example, when the projection mirror 24 is designed based on the convergence position of the green laser beam (dashed line), the convergence positions of the red laser beam (solid line) and the blue laser beam (chain line) greatly deviate from that of the green laser beam (dashed line). Therefore, the projection positions of the red, green, and blue laser beams onto the retina 26 differ from each other, and the user thereby cannot recognize a good image.

Figure 3:
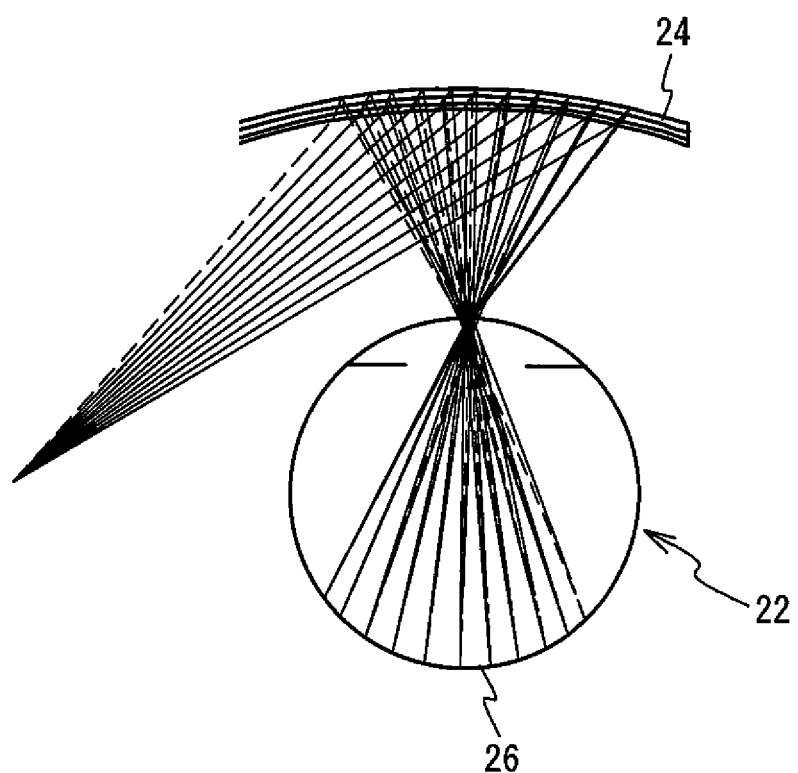
FIG. 3 illustrates the projections of red, green, and blue laser beams by a projection mirror using a multilayered half mirror having a compositional structure of a free curved surface and a diffraction surface.

To avoid such a situation, the projection mirror 24 preferably employs a multilayered half mirror in which two or more wavelength selective films with a free curved surface are stacked, and each layer preferably has an appropriate diffraction surface. FIG. 3 illustrates the projections of the red, green, and blue laser beams by the projection mirror 24 using a multilayered half mirror having a compositional structure of a free curved surface and a diffraction surface. In FIG. 3, the red laser beam is indicated by the solid line, the green laser beam is indicated by the dashed line, and the blue laser beam is indicated by the chain line. As illustrated in FIG. 3, when the projection mirror 24 employs a multi-layered half mirror in which three wavelength selective films, each having a free curved surface, are stacked, and the layers have the diffraction surfaces that reflect the red, green, and blue laser beams in appropriate directions, the projection positions of the red, green, and blue laser beams onto the retina 26 can become the same. This allows the user to recognize a good color image.

Figure 4A:
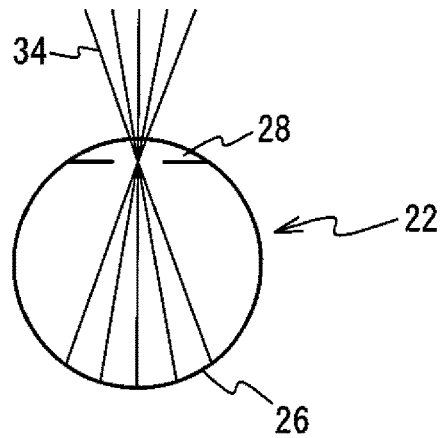
FIG. 4A through FIG. 4C illustrate the projection of the laser beam onto the retina with respect to the move of the eyeball when the laser beam is converged near the pupil.
Figure 4B:
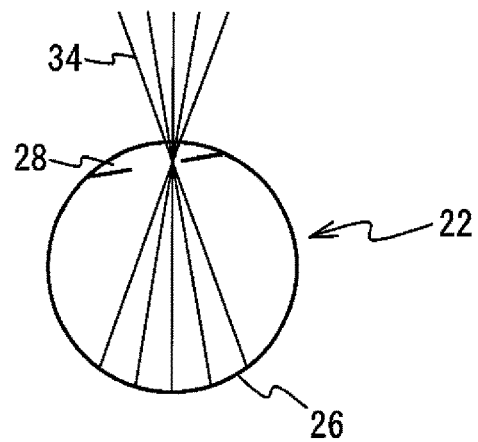
Figure 4C:
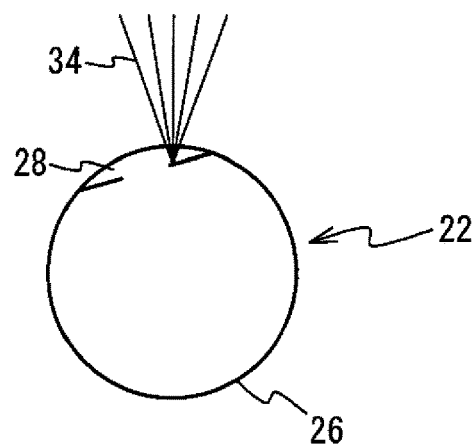

A description will now be given of a reason why the convergence position of the laser beam 34 that has been scanned by the scanning mirror 14 (scanned light) is configured to be at the retina 26 side beyond the pupil 28 as explained in FIG. 1A and FIG. 1B. FIG. 4A through FIG. 4C illustrate the projection of the laser beam 34 onto the retina 26 with respect to the move of the eyeball 22 when the laser beam 34 is converged near the pupil 28. FIG. 4A illustrates a case where the eyeball 22 faces the front, FIG. 4B illustrates a case where the eyeball 22 looks leftward from the front, and FIG. 4C illustrates a case where the eyeball 22 looks further leftward.

Assume that the laser beam 34 is converged near the center of the pupil 28 and then projected onto the retina 26 when the eyeball 22 faces the front as illustrated in FIG. 4A. In this case, when the eyeball 22 looks leftward, the laser beam 34 is converged near the edge of the pupil 28 and projected onto the retina 26 as illustrated in FIG. 4B. When the eyeball 22 looks further leftward, the laser beam 34 fails to enter the pupil 28 and fails to be projected onto the retina 26 as illustrated in FIG. 4C. As described above, depending on the rotation angle of the eyeball 22, the laser beam 34 is not projected onto the retina 26, and the user can not recognize an image.

Thus, to reduce the missing of an image due to the move of the eyeball 22, the convergence position of the laser beam 34 by the projection mirror 24 is configured to be at the retina 26 side beyond the pupil 28. In addition, to reduce the missing of an image, the operating range of the scanning mirror 14 is extended to increase the incidence angles of the laser beam 34 entering the eyeball 22 in the horizontal and vertical directions to, for example, 90° or greater.

Figure 5A:
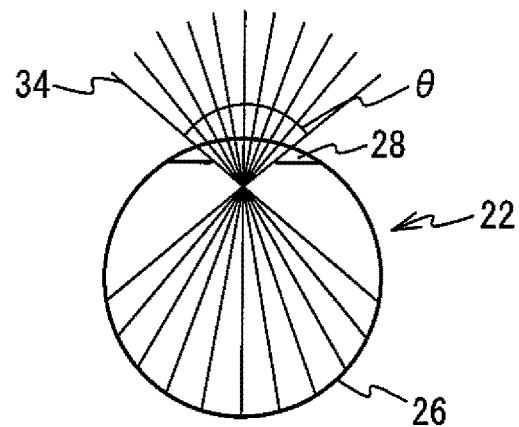
FIG. 5A through FIG. 5C illustrate the projection of the laser beam onto the retina with respect to the move of the eyeball when the laser beam is converged at the retina side beyond the pupil, and when a horizontal incidence angle θ of the laser beam entering the eyeball is configured to be equal to 90° or greater.
Figure 5B:
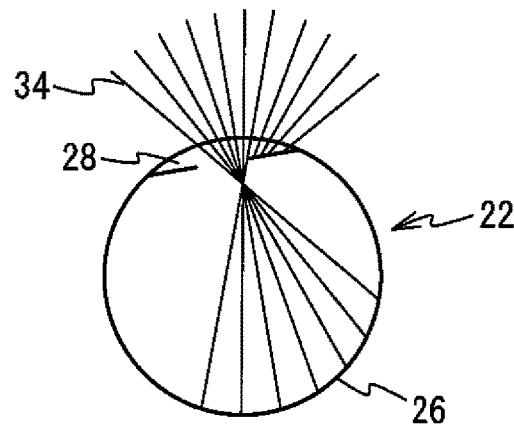
Figure 5C:
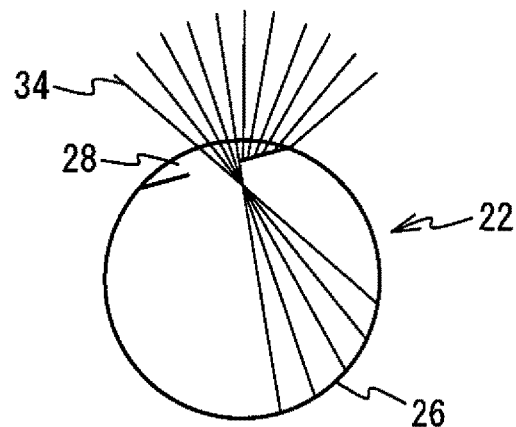

FIG. 5A through FIG. 5C illustrate the projection of the laser beam 34 onto the retina 26 with respect to the move of the eyeball 22 when the laser beam 34 is converged at the retina 26 side beyond the pupil 28, and the incidence angle of the laser beam 34 entering the eyeball 22 is configured to be equal to 90° or greater. FIG. 5A illustrates a case where the eyeball 22 faces the front, FIG. 5B illustrates a case where the eyeball 22 looks leftward from the front, and FIG. 5C illustrates a case where the eyeball 22 looks further leftward.

Assume that the laser beam 34 is converged at a position located at the retina 26 side viewed from near the center of the pupil 28, enters the eyeball 22 at the horizontal incidence angle $\theta$ of 90° or greater, and is projected onto the retina 26 when the eyeball 22 faces the front as illustrated in FIG. 5A. In this case, even when the eyeball 22 looks leftward, a part of the laser beam 34 is projected onto the retina 26 as illustrated in FIG. 5B and FIG. 5C, and the missing of an image is thus reduced. The same is applicable to a case where the eyeball 22 moves in the vertical direction. As described above, when the laser beam 34 that has been scanned by the scanning mirror 14 (scanned light) is converged at the retina 26 side beyond the pupil 28, and the incidence angle of the laser beam 34 entering the eyeball 22 is increased, the missing of an image due to the move of the eyeball 22 is reduced. However, this does not completely reduce the missing of a part of an image.

The inventors have found a method of reducing the missing of an image by scanning the laser beam 34 with use of a part of the operating range of the scanning mirror 14 while the operating range of the scanning mirror 14 is extended to increase the incidence angle of the laser beam 34 entering the eyeball 22 (to, for example, 90° or greater). That is to say, the inventors have found a method that does not scan the laser beam 34 by using all the operating range within which the scanning mirror 14 operates laterally and vertically, but scans the laser beam 34 by using a part of the operating range in the lateral and vertical directions. That is to say, while the scanning mirror 14 operates laterally and vertically within the operating range, the controller 16 controls the light source 12 to emit the laser beam 34 only when the scanning mirror 14 is operating within a range that is a part of the operating range.

Figure 6A:
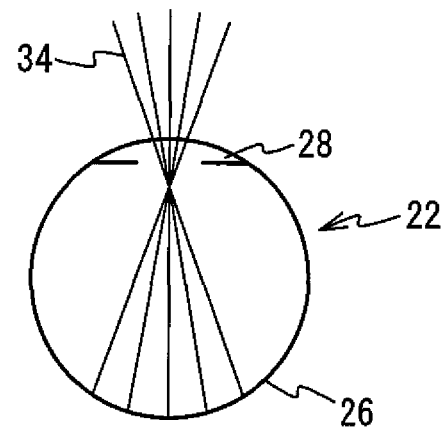
FIG. 6A through FIG. 6C illustrate the projection of the laser beam onto the retina with respect to the move of the eyeball when the position of the scan range of the laser beam is changed within the operating range of a scanning mirror.
Figure 6B:
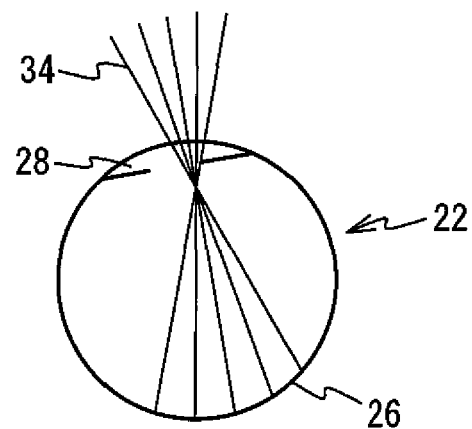
Figure 6C:
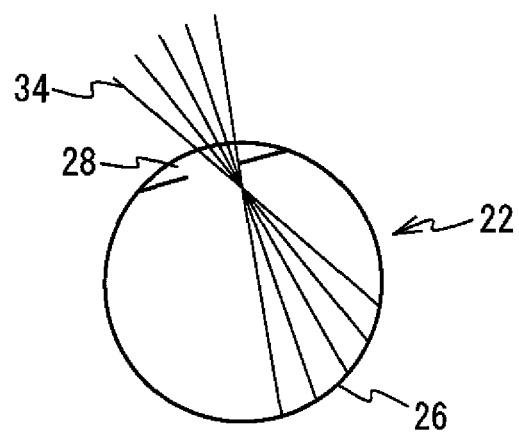

When the range with which the laser beam 34 is scanned is changed within the operating range of the scanning mirror 14, the position of the laser beam 34 projected onto the retina 26 changes. Thus, when the position of the scan range of the laser beam 34 is changed in accordance with the move of the eyeball 22, all of the laser beam 34 that has been scanned (scanned light) can be projected onto the retina 26 even when the eyeball 22 has moved. This will be explained with use of FIG. 6A through FIG. 6C. FIG. 6A through FIG. 6C illustrate the projection of the laser beam 34 onto the retina 26 with respect to the move of the eyeball 22 when the position of the scan range of the laser beam 34 is changed within the operating range of the scanning mirror 14. FIG. 6A illustrates a case where the eyeball 22 faces the front, FIG. 6B illustrates a case where the eyeball 22 looks leftward from the front, and FIG. 6C illustrates a case where the eyeball 22 looks further leftward.

Assume that the laser beam 34 is scanned near the center of the operating range of the scanning mirror 14 and projected onto near the center of the retina 26 when the eyeball 22 faces the front as illustrated in FIG. 6A. When the eyeball 22 looks leftward, the laser beam 34 can be projected onto the retina 26 by scanning the laser beam 34 in a region shifted from near the center of the operating range of the scanning mirror 14 in the direction corresponding to the move of the eyeball 22 as illustrated in FIG. 6B. When the eyeball 22 looks further leftward, the laser beam 34 can be projected onto the retina 26 by scanning the laser beam 34 in a region further shifted from near the center of the operating range of the scanning mirror 14 as illustrated in FIG. 6C.

As described above, the missing of an image projected onto the retina 26 can be reduced and a good image can be provided to the user by scanning the laser beam 34 emitted from the light source 12 by using a part of the operating range of the scanning mirror 14. For example, the missing of an image projected onto the retina 26 is reduced by scanning the laser beam 34 emitted from the light source 12 in different positions within the operating range of the scanning mirror 14 in accordance with the move of the eyeball 22.

To scan the laser beam 34 in different positions within the operating range of the scanning mirror 14 in accordance with the move of the eyeball 22 of the user, the user may operate a mobile terminal including the controller 16, and the controller 16 may control the emission of the laser beam 34 from the light source 12 based on the operation. Alternatively, a well-known device detecting the move of the eyeball 22 may be provided, and the controller 16 may control the emission of the laser beam 34 from the light source 12 based on the feedback from the device.

To allow the laser beam 34 to be projected onto the retina 26 even when the eyeball 22 broadly moves, the incidence angle of the laser beam 34, which is scanned within the operating range of the scanning mirror 14, to the eyeball 22 of the user by the projection mirror 24 is preferably large. For example, the incidence angle to the eyeball 22 in the horizontal direction is preferably equal to 70° or greater, is more preferably equal to 80° or greater, is yet more preferably equal to 90° or greater, and is further preferably equal to 100° or greater. The incidence angle to the eyeball 22 in the vertical direction is preferably equal to 60° or greater, is more preferably equal to 70° or greater, is yet more preferably 90° or greater, and is further preferably equal to 100° or greater.

Second Embodiment

Figure 7:
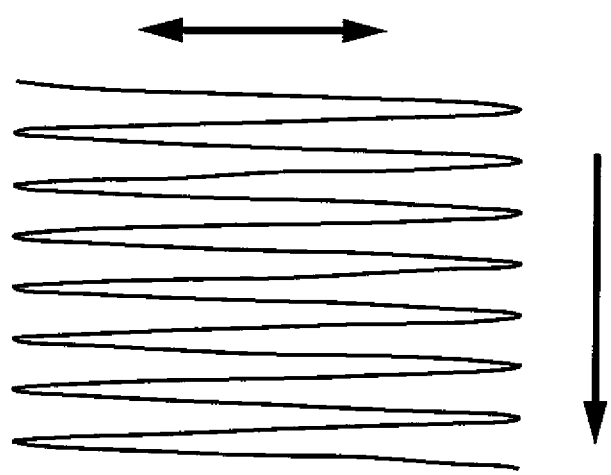
FIG. 7 illustrates a scan trajectory of the laser beam in raster scan by the scanning mirror.

The configuration of an image projection device in accordance with a second embodiment is the same as that of the first embodiment illustrated in FIG. 1A and FIG. 1B, and thus the description thereof is omitted. A method called raster scan is used to project an image onto the retina 26 by scanning the laser beam 34 by the scanning mirror 14. FIG. 7 illustrates a scan trajectory of the laser beam in raster scan by the scanning mirror 14. As illustrated in FIG. 7, in raster scan, an image is displayed by scanning the laser beam from the upper left to the lower right of the image at high speed. Thus, simulated were the scan trajectory of the laser beam projected onto the retina 26 by scanning the laser beam by raster scan.

Figure 8A:
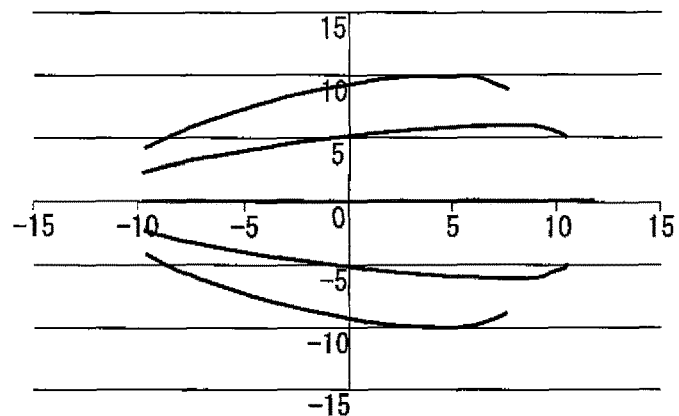
FIG. 8A through FIG. 8C illustrate results of simulation that calculated the scan trajectory of the laser beam projected onto the retina.
Figure 8B:
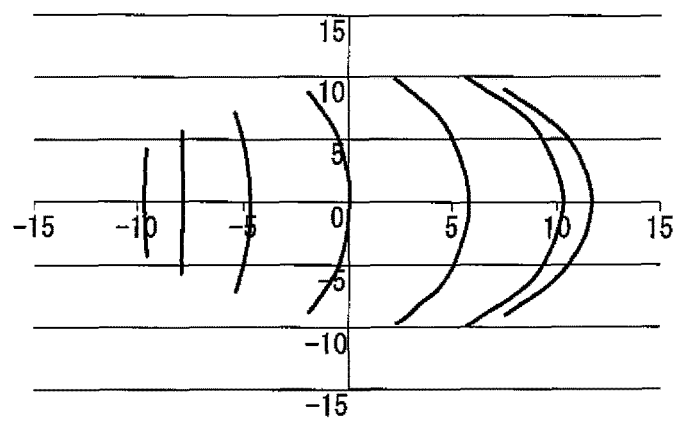
Figure 8C:
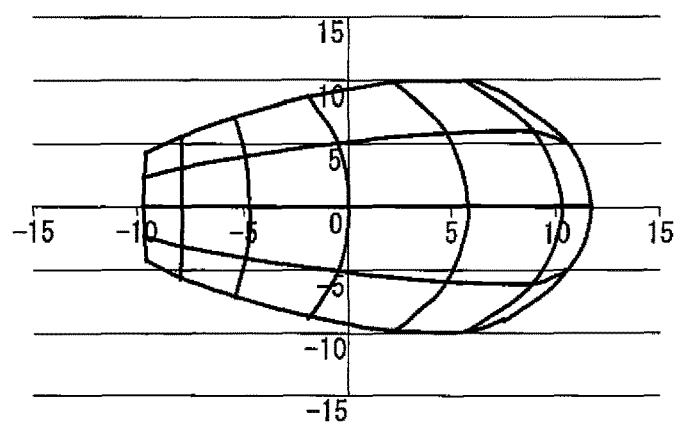

FIG. 8A through FIG. 8C illustrate results of the simulation that calculated the scan trajectory of the laser beam 34 projected onto the retina 26. FIG. 8A through FIG. 8C illustrate simulation results when the eyeball 22 faces the front. The horizontal axis represents a distance [mm] from the center of the retina 26 in the lateral direction, and the vertical axis represents a distance [mm] from the center of the retina 26 in the longitudinal direction. FIG. 8A illustrates the simulation result of the scan trajectory when the laser beam is scanned only in the horizontal direction in five positions between which the interval is constant in the vertical direction. FIG. 8B illustrates the simulation result of the scan trajectory when the laser beam is scanned only in the vertical direction in seven positions between which the interval is constant in the horizontal direction. FIG. 8C is formed by overlapping FIG. 8A with FIG. 8B.

FIG. 8A through FIG. 8C reveal that, when an image is projected onto the retina 26 by scanning the laser beam 34 emitted based on image data of an rectangle image, the image projected onto the retina 26 does not become a rectangle image but becomes an inclined trapezoidal image. That is to say, an image of which the height gradually changes from one of a pair of vertical sides to the other one is projected onto the retina 26. FIG. 8B and FIG. 8C reveal that the inclined trapezoidal image projected onto the retina 26 is an image of which the curvature gradually increases from the shorter side to the longer side of the vertical sides. This reveals that it is difficult for the user to see a good image even when the missing of an image is reduced by scanning the laser beam 34 by using a part of the operating range of the scanning mirror 14. Thus, the second embodiment describes an image projection device capable of projecting a good image on the retina 26.

As described above, when an image is projected onto the retina 26 by scanning the laser beam 34 emitted based on image data of a rectangle image, an inclined trapezoidal image of which the curvature gradually increases from the shorter side to the longer side of the vertical sides is projected. That is to say, when the laser beam is emitted based on image data of an image obtained by correcting the image obtained from FIG. 8C reversely, the rectangle image in which the curvature is corrected can be projected onto the retina 26. That is to say, a good image with reduced distortion can be projected by emitting a laser beam based on image data of an image that has a shape obtained by rotating an inclined trapezoidal shape obtained from FIG. 8C by 180° and to which the curvature that cancels out the curvature obtained from FIG. 8C is applied.

Figure 9:
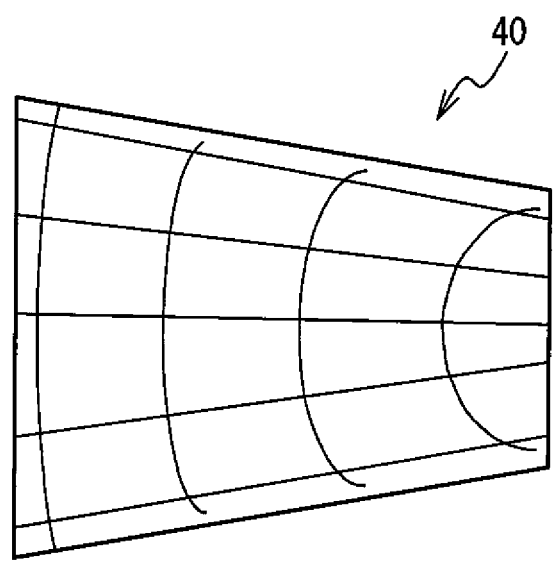
FIG. 9 illustrates corrected image data.

Thus, in the second embodiment, the controller 16 generates corrected image data 40 by gradually changing the height of the image of the input image data from one vertical side to the other vertical side and gradually changing the curvature of the image from one vertical side to the other vertical side as illustrated in FIG. 9. The controller 16 then controls the light source 12 to emit the laser beam 34 based on the corrected image data 40. This enables to project a good image with reduced distortion onto the retina 26, and enables to provide a good image to the user.

As illustrated in FIG. 1A and FIG. 1B, when the scanning mirror 14 is located at the left of the eyeball 22, the controller 16 preferably generates corrected image data in which an image has a quadrangle shape of which the left vertical side is longer than the right vertical side, and in which the curvature of the image toward the longer side gradually increases from the longer side to the shorter side of the vertical sides as illustrated in FIG. 9. When the scanning mirror 14 is located at the right of the eyeball 22, the controller 16 preferably generates corrected image data in which an image has a quadrangle shape of which the right vertical side is longer than the left vertical side, and in which the curvature of the image toward the longer side gradually increases from the longer side to the shorter side of the vertical sides.

Third Embodiment

Figure 10A:
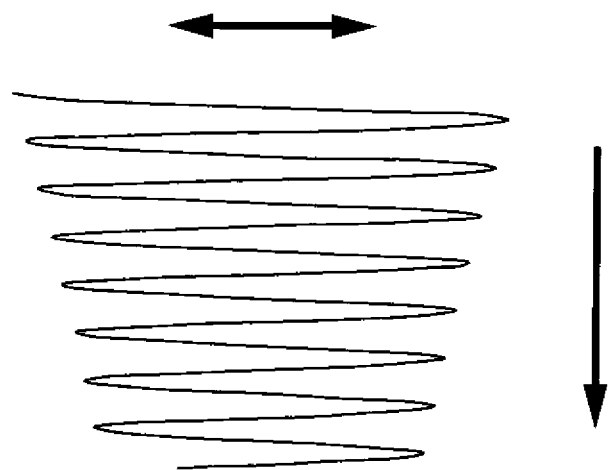
FIG. 10A and FIG. 10B illustrate a scan trajectory of the laser beam in raster scan by a scanning mirror of a third embodiment.
Figure 10B:
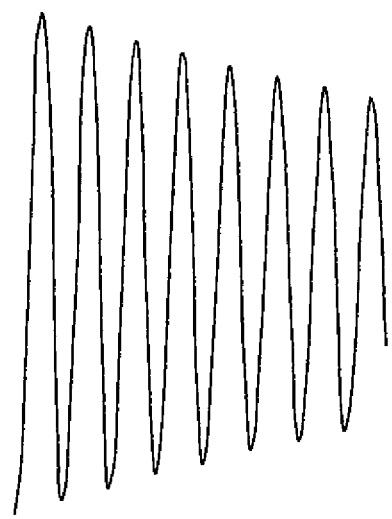

A third embodiment is another embodiment capable of projecting a good image with reduced distortion onto the retina 26. The third embodiment differs from the first embodiment and the second embodiment in the scanning mirror 14, and uses the scanning mirror 14 described hereinafter. FIG. 10A and FIG. 10B illustrate a scan trajectory of the laser beam in raster scan by the scanning mirror 14 of the third embodiment. As illustrated in FIG. 10A, the third embodiment uses the scanning mirror 14 of which the scanning amplitude in the horizontal direction is not constant in the vertical direction and gradually decreases in the vertical direction. To modulate the scanning amplitude in the horizontal direction in such a manner, voltage applied to the scanning mirror 14 is changed.

The aforementioned scanning mirror 14 is rotated by, for example, 90° with respect to the scanning mirror 14 of the first embodiment and the second embodiment, and then mounted. This makes it possible to obtain the scanning mirror 14 of which the scanning amplitude in the vertical direction gradually decreases in the horizontal direction as illustrated in FIG. 10B. The mounting angle of the scanning mirror 14 is not limited to 90°, and may be an angle near 90°. For example, the scanning mirror 14 may be rotated by 85° to 95°, or may be rotated by 80° to 100°. Other configurations of the third embodiment are the same as those of the first embodiment illustrated in FIG. 1A and FIG. 1B, and thus the description thereof is omitted.

The use of the scanning mirror 14 described in FIG. 10A and FIG. 10B can prevent the projection of an inclined trapezoidal image described in FIG. 8A onto the retina 26 even when the laser beam is emitted based on image data of a rectangle image. However, this cannot completely prevent the curvature of an image described in FIG. 8B.

Figure 11:
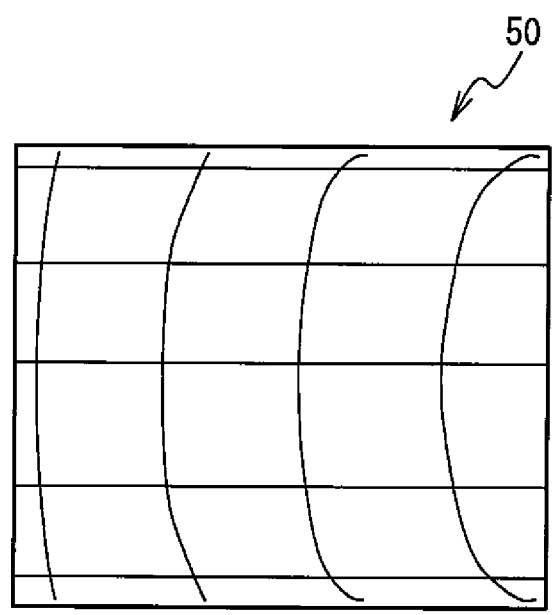
FIG. 11 illustrates corrected image data.

Thus, the third embodiment generates corrected image data described hereinafter and makes the light source 12 emit the laser beam 34 based on the corrected image data in addition to rotating the scanning mirror 14 of which the scanning amplitude in the horizontal direction gradually changes in the vertical direction to use it. That is to say, the controller 16 generates corrected image data 50 by rotating the image of the input image data, and gradually changing the curvature of the image from one vertical side to the other vertical side as illustrated in FIG. 11. The controller 16 controls the light source 12 to emit the laser beam 34 based on the corrected image data 50. This enables to project a good image with reduced distortion onto the retina 26, and enables to provide a good image to the user. To project the correct image onto the retina 26, the scanning mirror 14 is preferably rotated in the same direction and by approximate the same angle as the image of the input image data is rotated. For example, when the scanning mirror 14 is rotated by 90°, the image of the input image data is preferably rotated by 90° in the direction same as the rotation direction of the scanning mirror 14.

Also in the third embodiment, as with in the second embodiment, when the scanning mirror 14 is located at the left of the eyeball 22, the controller 16 preferably generates corrected image data in which the curvature toward the left vertical side gradually increases from the left vertical side to the right vertical side. On the other hand, when the scanning mirror 14 is located at the right of the eyeball 22, the controller 16 preferably generates corrected image data in which the curvature toward the right vertical side gradually increases from the right vertical side to the left vertical side.

Fourth Embodiment

Figure 12:
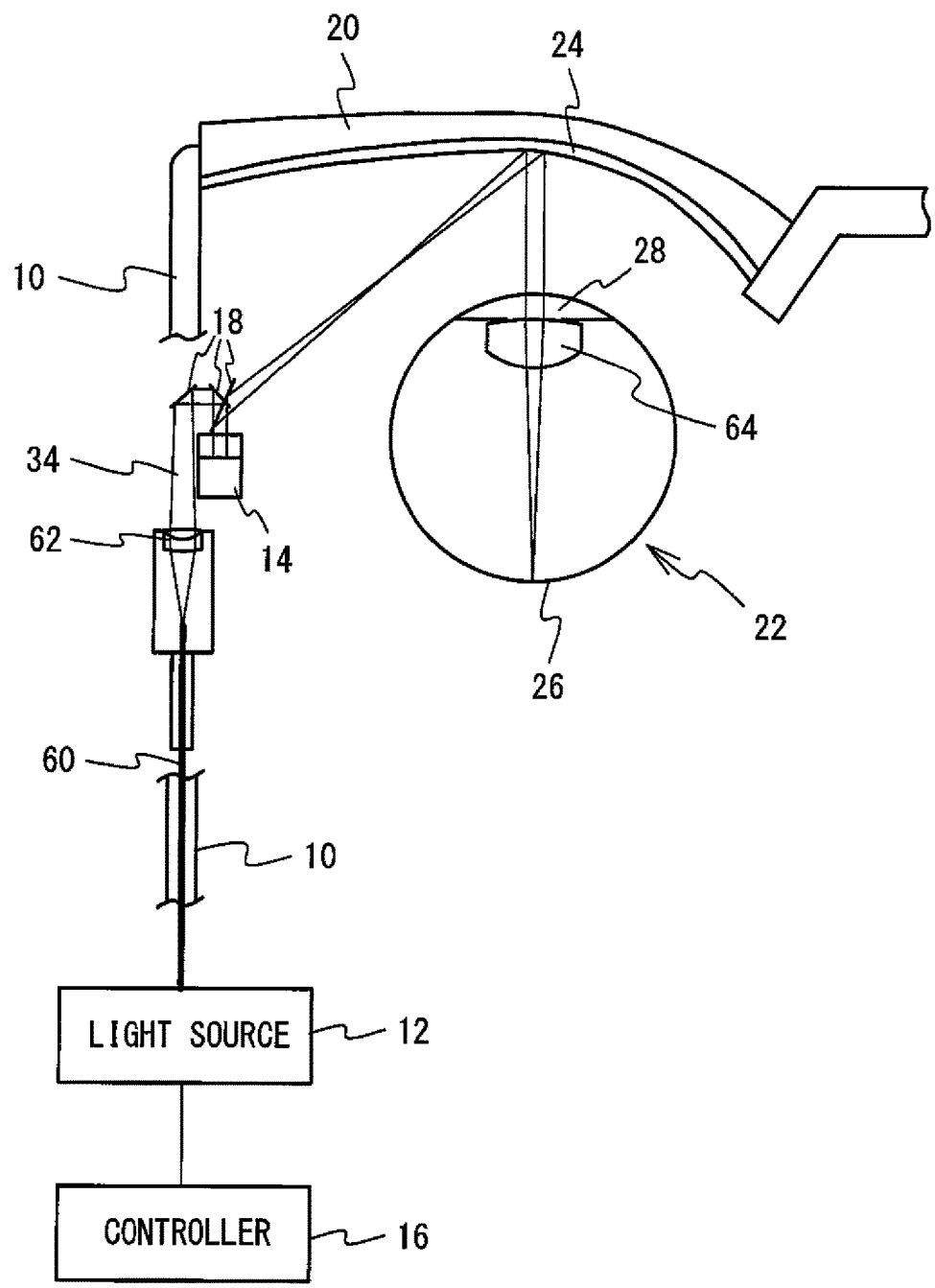
FIG. 12 illustrates an image projection device in accordance with a fourth embodiment viewed from above.

FIG. 12 illustrates an image projection device in accordance with a fourth embodiment viewed from above. Unlike FIG. 1A, a single laser beam (a laser beam) having a finite light beam diameter is illustrated enlarged in FIG. 12. As illustrated in FIG. 12, in the image projection device of the fourth embodiment, the light source 12 is not mounted in the temple 10 of the glasses and is separately located, and the laser beam 34 emitted from the light source 12 is introduced through an optical fiber 60 and enters the scanning mirror 14. A condensing lens 62 is located in the light path of the laser beam 34 between the optical fiber 60 and the scanning mirror 14 and in the temple 10 of the glasses. Other configurations are the same as those of the first embodiment illustrated in FIG. 1A and FIG. 1B, and thus the description thereof is omitted.

Figure 13A:
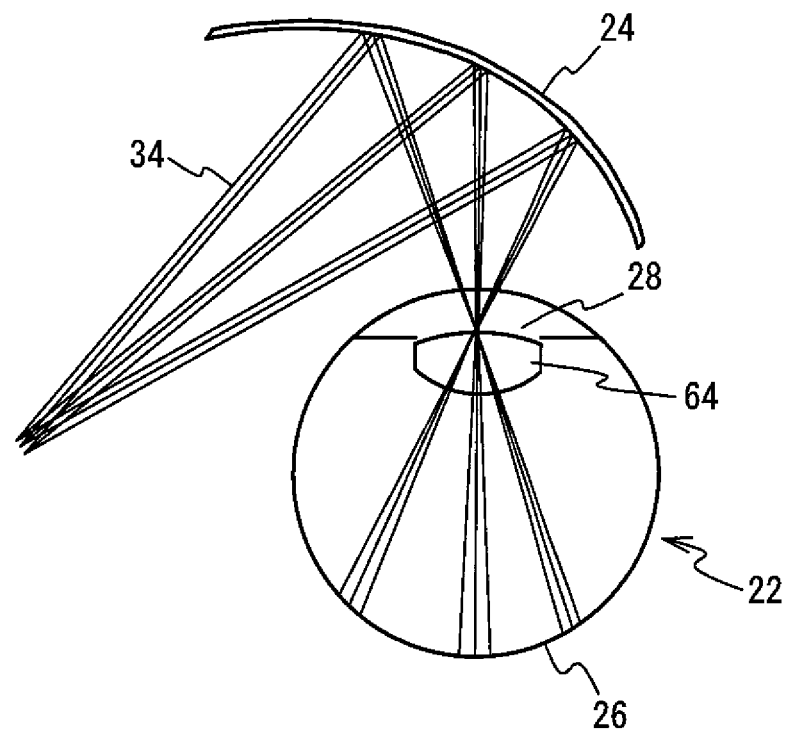
FIG. 13A illustrates the projection of the laser beam onto the retina when the laser beam enters the projection mirror while being a parallel beam.

Here, a description will be given of the difference in the laser beam 34 projected onto the retina 26 of the eyeball 22 between a case where the laser beam 34 in the scanned light enters the projection mirror 24 while being a parallel beam and a case where it enters while being a diverging beam. FIG. 13A illustrates the projection of the laser beam 34 onto the retina 26 when the laser beam 34 enters the projection mirror 24 while being a parallel beam, and FIG. 13B illustrates the projection of the laser beam 34 onto the retina 26 when the laser beam 34 enters while being a diverging beam.

As illustrated in FIG. 13A, the scanned light composed of the laser beam 34 that has been scanned by the scanning mirror 14 is converged near the pupil 28 by the projection mirror 24 to pass through the pupil 28 as described in FIG. 6A through FIG. 6C described above. The convergence range of the scanned light near the pupil 28 is preferably a range with a diameter of approximately 2 mm, for example. When the laser beam 34 in the scanned light enters the projection mirror 24 while being a parallel beam, the laser beam 34 is also focused near the pupil 28 by the projection mirror 24 having such a condensing power. When the laser beam 34 is focused near the pupil 28, it is projected onto the retina 26 as a diverging beam. This increases the beam spot size of the laser beam 34 projected onto the retina 26, and a somewhat defocused image may be projected onto the retina 26.

Figure 13B:
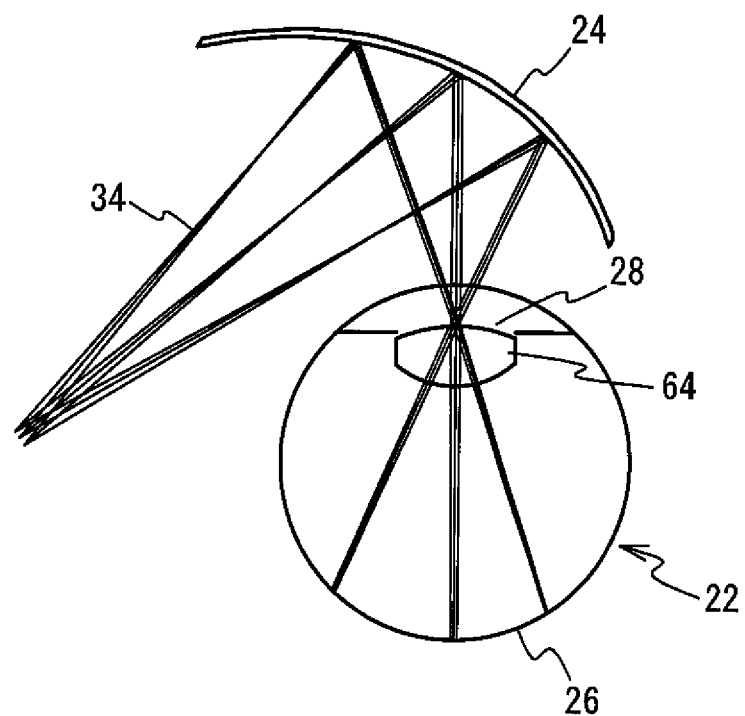
FIG. 13B illustrates the projection of the laser beam onto the retina when the laser beam enters the projection mirror while being a diverging beam.

On the other hand, when the laser beam 34 is focused before the projection mirror 24 as illustrated in FIG. 13B, and enters the projection mirror 24 while being a diverging beam, the laser beam 34 can enter the eyeball 22 while being a parallel beam by the condensing power of the projection mirror 24. The laser beam 34 entering the eyeball 22 as a parallel beam is focused near the retina 26 by a crystalline lens 64. This allows the beam spot size of the laser beam 34 projected onto the retina 26 to be a proper size. The size of the laser beam 34 when it enters the projection mirror 24 is preferably small so that the diameter of the laser beam 34 when it enters the eyeball 22 is thinner than the pupil 28.

The image projection device of the fourth embodiment includes, as illustrated in FIG. 12, the condensing lens 62 that focuses the laser beam 34 emitted from the optical fiber 60. Thus, the laser beam 34 emitted from the optical fiber 60 is converted to a convergent beam by the condensing lens 62. An appropriate lens is selected for the condensing lens 62 so that the laser beam 34 is converted to a convergent beam that is focused between the scanning mirror 14 and the projection mirror 24. This allows the laser beam 34 in the scanned light to enter the projection mirror 24 while being a diverging beam. Thus, as described in FIG. 13B, the beam spot size of the laser beam 34 projected onto the retina 26 can become a proper size.

As described above, the fourth embodiment provides the condensing lens 62 (an optical means) that allows the laser beam 34 in the scanned light to enter the projection mirror 24 as a diverging beam. This allows the laser beam 34 to enter the eyeball 22 as a light beam (e.g., a parallel beam) that is focused near the retina 26 by the crystalline lens 64 of the eyeball 22 of the user as described in FIG. 13B. Thus, the beam spot size of the laser beam 34 projected onto the retina 26 can become a proper size, and a good image can be provided to the user.

The fourth embodiment provides the condensing lens 62 as an optical means as illustrated in FIG. 12. However, instead of the condensing lens 62, a diverging lens that allows the laser beam 34 in the scanned light to enter the projection mirror 24 as a diverging beam with a small diameter may be provided.

Figure 14:
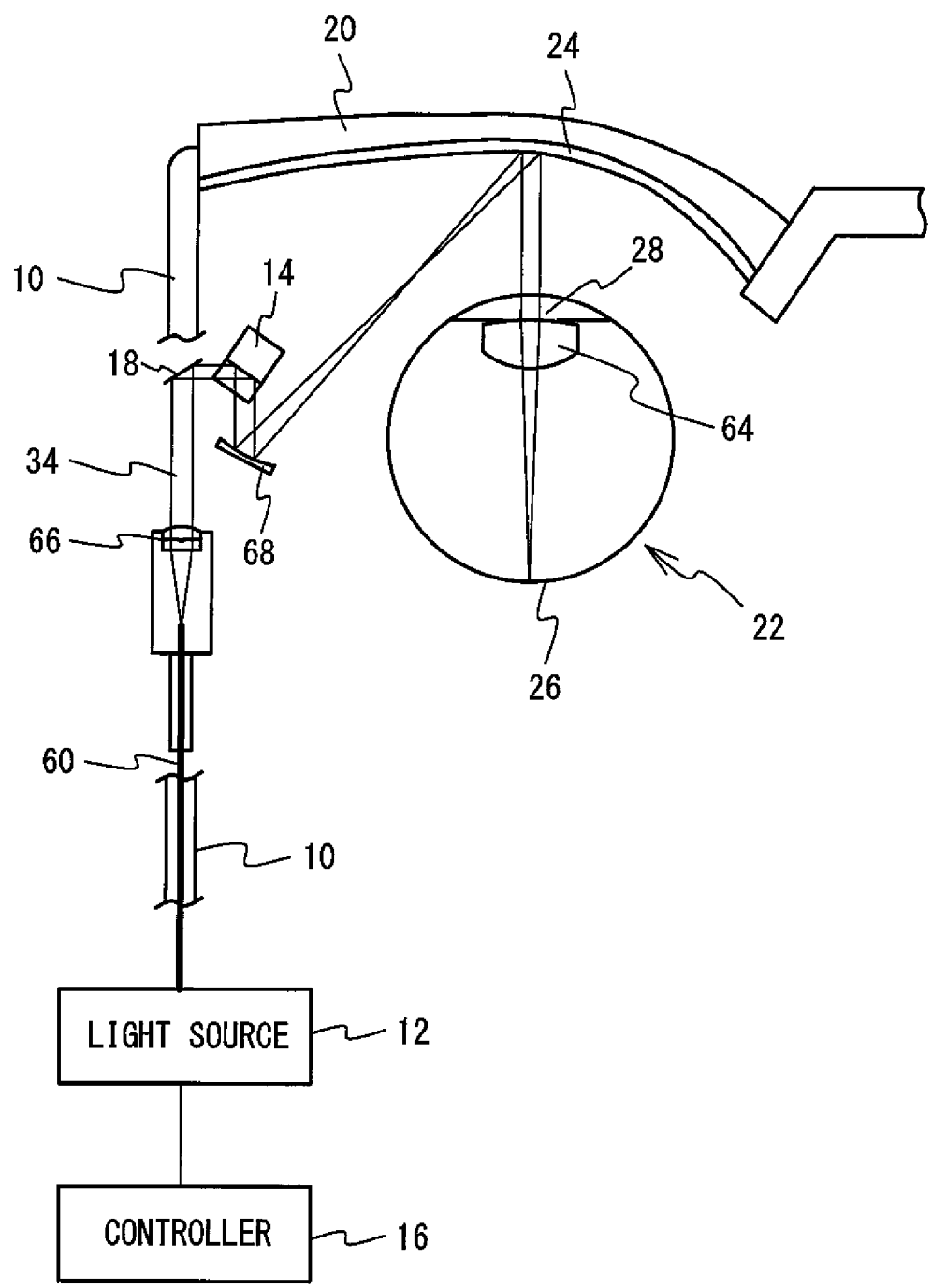
FIG. 14 illustrates an image projection device in accordance with a first variation of the fourth embodiment viewed from above.

FIG. 14 illustrates an image projection device in accordance with a first variation of the fourth embodiment viewed from above. As with in FIG. 12, a single laser beam (a laser beam) is illustrated enlarged in FIG. 14. As illustrated in FIG. 14, the first variation of the fourth embodiment differs from the fourth embodiment in that a collimator lens 66 is located in the temple 10 of the glasses instead of the condensing lens, and in that a concave mirror 68 is located in the light path of the scanned light between the scanning mirror 14 and the projection mirror 24.

In the image projection device of the first variation of the fourth embodiment, the laser beam 34 emitted from the optical fiber 60 is converted to a parallel beam by the collimator lens 66, and then enters the scanning mirror 14. The scanned light composed of the laser beam 34 that has been scanned by the scanning mirror 14 enters the concave mirror 68. Thus, the laser beam 34 in the scanned light is converted to a convergent beam that is focused before the projection mirror 24 by the concave mirror 68, and then enters the projection mirror 24 as a diverging beam. An appropriate mirror is selected for the concave mirror 68 so that the laser beam 34 in the scanned light is focused before the projection mirror 24 as described above. This allows the laser beam 34 in the scanned light to enter the eyeball 22 as a light beam (e.g., a parallel beam) that is focused near the retina 26 by the crystalline lens 64 of the eyeball 22 of the user as with in the fourth embodiment. Thus, the beam spot size of the laser beam 34 projected onto the retina 26 can become a proper size, and a good image can be provided to the user.

In the first variation of the fourth embodiment, the concave mirror 68 is provided as an optical means, but a convex mirror that allows the laser beam 34 in the scanned light to enter the projection mirror 24 as a diverging beam with a small diameter may be provided instead of the concave mirror 68.

As described in the fourth embodiment and the first variation of the fourth embodiment, the optical means that allows the laser beam 34 in the scanned light to enter the projection mirror 24 as a diverging beam may be located in the light path of the laser beam 34 before reaching the scanning mirror 14, or may be located in the light path of the scanned light composed of the laser beam 34 that has been scanned by the scanning mirror 14. The above described case where the laser beam 34 entering the eyeball 22 is a parallel beam is not limited to a case where the laser beam 34 is a complete parallel beam, and includes a case when the laser beam 34 is a parallel beam that can be focused on the retina 26 by the crystalline lens 64.

Fifth Embodiment

The first embodiment provides the projection mirror 24 made of a half mirror having a compositional structure of a free curved surface and a diffraction surface, which is a structure designed to have a reflective diffraction surface located on the curved surface, on the surface of the lens 20 of the glasses at the eyeball 22 side as illustrated in FIG. 1A through FIG. 3. However, in this case, the projection mirror 24 that is properly designed may have difficulty in being placed on the eyeball 22 side surface of the lens 20. That is to say, the structure where the projection mirror 24 is located on the eyeball 22 side surface of the lens 20 may have difficulty in achieving both the function as a projection mirror that projects the laser beam 34 onto the retina 26 of the eyeball 22 and the function as a lens of the glasses that provides the sight of the object through the lens 20. The diffraction element located in the projection mirror 24 has inhomogeneous pitch intervals to project the laser beam 34 onto the retina 26. Thus, the diffraction element that has unequal pitches and is axial asymmetry is drawn and processed on the curved surface. In a part having a large diffraction angle, the pitch interval of the diffraction element is decreased to an approximate wavelength. Thus, the manufacture of the projection mirror 24 is difficult. Thus, the fifth embodiment describes a case that can achieve both the function as a projection mirror and the function as a lens of glasses.

Figure 15A:
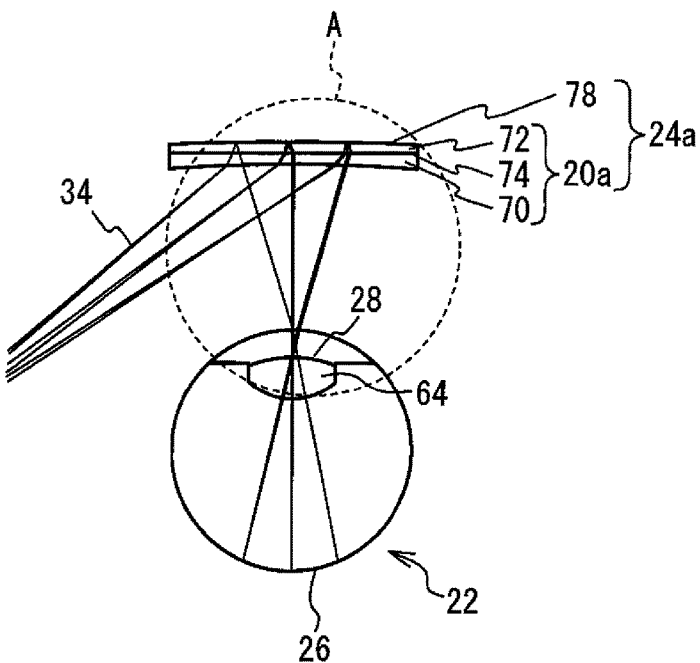
FIG. 15A is a top view illustrating a part of an image projection device in accordance with a fifth embodiment.
Figure 15B:
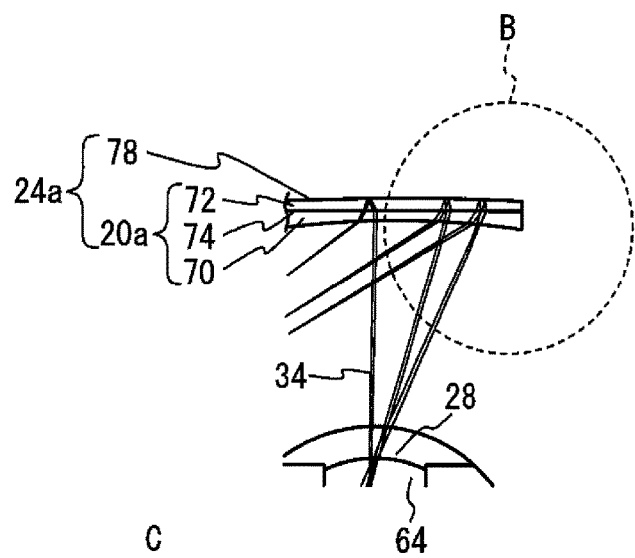
FIG. 15B is a top view that enlarges a range A of FIG. 15A.
Figure 15C:
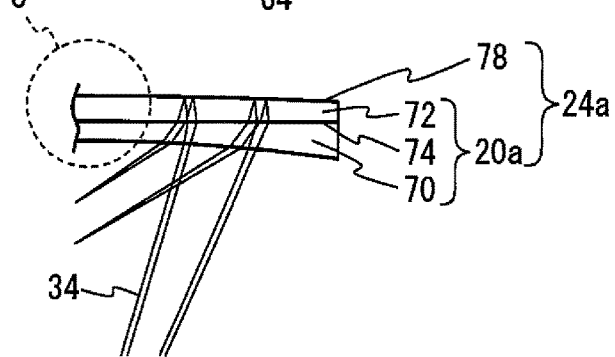
FIG. 15C is a top view that enlarges a range B of FIG. 15B.
Figure 16:
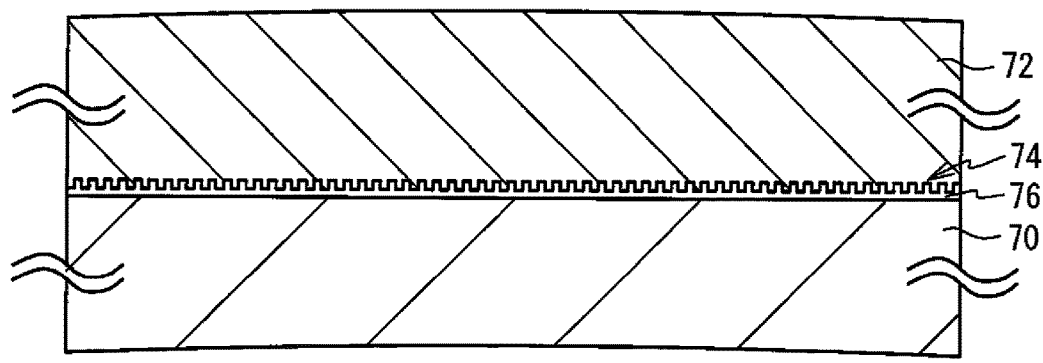
FIG. 16 is a cross-sectional view that enlarges a range C of FIG. 15C.

FIG. 15A is a top view illustrating a part of the image projection device in accordance with the fifth embodiment, FIG. 15B is a top view that enlarges a range A of FIG. 15A, and FIG. 15C is a top view that enlarges a range B of FIG. 15B. FIG. 16 is a cross-sectional view that enlarges a range C of FIG. 15C. In FIG. 15A through FIG. 15C, a single laser beam (a laser beam) having a finite light beam diameter is illustrated enlarged as with in FIG. 12 of the fourth embodiment.

As illustrated in FIG. 15A through FIG. 16, a lens 20a of glasses includes a first lens portion 70 and a second lens portion 72 in this order from the eyeball 22 side, and a transmissive diffraction element 74 is located between the first lens portion 70 and the second lens portion 72. The first lens portion 70 and the second lens portion 72 may be made of the same glass material or made of different glass materials. The material is appropriately selected in consideration of the performance of the glasses lens and the performance of the diffraction element. The first lens portion 70 and the second lens portion 72 may adhere with each other across the diffraction element 74, or an air layer 76 may be located at one side of the diffraction element 74 as illustrated in FIG. 16. This increases the degree of freedom of the method of manufacturing the diffraction element 74. In FIG. 16, the upper surface of the first lens portion 70 is a plane surface, and recesses and protrusions are formed on the lower surface of the second lens portion 72, but the lower surface of the second lens portion 72 may be a plane surface and recesses and protrusions may be formed on the upper surface of the first lens portion 70.

The diffraction element 74 linearly extends in a direction parallel to the pupil 28 in a state where the eyeball 22 faces the front for example. The diffraction element 74 may extend while being tilted with respect to the pupil 28 in a state where the eyeball 22 faces the front. For example, in consideration of the diffraction angle, the diffraction element 74 may extend while being tilted so that the diffraction element 74 is closer to the opposite surface of the lens 20a from the eyeball 22 at the side that the laser beam 34 enters (the left side in FIG. 15A) and is closer to the eyeball 22 side surface of the lens 20a at the side opposite to the side that the laser beam 34 enters (the right side in FIG. 15A). The diffraction element 74 may be located across the entire of the lens 20a, or may be located within a range of approximately 20 mm×20 mm.

The opposite surface of the second lens portion 72 from the eyeball 22 is coated with, for example, a reflection film 78. The details will be described later, but the lens 20a and the reflection film 78 function as a projection mirror 24a that projects the laser beam 34 that has been scanned by the scanning mirror (scanned light) onto the retina 26 of the eyeball 22 to project an image onto the retina 26. That is to say, in the fifth embodiment, a half mirror is not located on the eyeball 22 side surface of the first lens portion 70 unlike the first through fourth embodiments. Other configurations are the same as those of the fourth embodiment illustrated in FIG. 12, and thus the description thereof is omitted.

A description will next be given of the light path through which the laser beam 34 emitted from the light source 12 reaches the retina 26 of the eyeball 22 with use of FIG. 12 and FIG. 15A through FIG. 15C. As described in FIG. 12 of the fourth embodiment, the laser beam 34 emitted from the light source 12 and introduced through the optical fiber 60 is converted into a convergent beam by the condensing lens 62, and then scanned by the scanning mirror 14. An appropriate lens is selected for the condensing lens 62 so that the laser beam 34 is converted into a convergent beam that is focused between the scanning mirror 14 and the lens 20a. This allows the laser beam 34 in the scanned light to enter the lens 20a while being a diverging beam.

The laser beam 34 in the scanned light enters the first lens portion 70 located at the eyeball 22 side of the lens 20a from the eyeball 22 side. When entering the first lens portion 70, the laser beam 34 is refracted in, for example, the thickness direction of the first lens portion 70. The laser beam 34 that has entered the first lens portion 70 passes through the diffraction element 74, and then enters the second lens portion 72. When entering the second lens portion 72, the laser beam 34 is refracted in, for example, the thickness direction of the second lens portion 72. The reflection film 78 located on the opposite surface of the second lens portion 72 from the eyeball 22 has a characteristic that selectively reflects light with the wavelength of the laser beam 34, and has a characteristic that passes the most (e.g., approximately 95%) of the laser beam 34, but reflects a part (e.g., approximately 5%) thereof. Therefore, a part of the laser beam 34 that has entered the second lens portion 72 is reflected at the opposite surface of the second lens portion 72 from the eyeball 22. The reflected laser beam 34 passes through the diffraction element 74 and the first lens portion 70, and is emitted from the first lens portion 70. The laser beam 34 emitted from the first lens portion 70 passes through the pupil 28 and the crystalline lens 64 of the eyeball 22, and is projected onto the retina 26.

According to the fifth embodiment, as illustrated in FIG. 15A through FIG. 15C, the lens 20a included in the projection mirror 24a includes the first lens portion 70 and the second lens portion 72 located in this order from the eyeball 22 side of the user, and the diffraction element 74 located between the first lens portion 70 and the second lens portion 72. The scanned light composed of the laser beam 34 enters the first lens portion 70 from the eyeball 22 side of the user, is then reflected at the opposite surface of the second lens portion 72 from the eyeball 22 of the user, and is projected onto the retina 26 of the eyeball 22 of the user. The aforementioned configuration enables to achieve the function as a projection mirror that projects the scanned light composed of the laser beam 34 onto the retina 26 of the eyeball 22 and the function as a lens of glasses that provides the sight of the object through the lens 20a. For example, when the transmission factor and the reflectance of the opposite surface of the second lens portion 72 from the eyeball 22 are properly configured and the diffraction efficiency of the diffraction element 74 is properly configured, both the function as a projection mirror (a component for the image projection device) and the function as a lens of glasses can be achieved.

As illustrated in FIG. 16, the diffraction element 74 preferably has a planar diffraction surface between the first lens portion 70 and the second lens portion 72. This eases the manufacture of the diffraction element 74. When the projection mirror 24 is located on the eyeball 22 side surface of the lens 20 as described in the first embodiment, the pitch interval of the diffraction element is small in a part where the diffraction angle is large as described above. On the other hand, in the fifth embodiment, the pitch interval of the diffraction element 74 can be prevented from decreasing because of the following reasons. The first reason is as follows. The laser beam 34 is refracted in the thickness direction of the first lens portion 70 and then enters the first lens portion 70, and the incidence angle to the diffraction element 74 thereby decreases. Thus, the diffraction power of the diffraction element 74 can be reduced. The second reason is as follows. In glasses such as glasses for short-sight, glasses for distance vision, and reading glasses, the second lens portion 72 generally has a convex shape toward the opposite side of the eyeball 22, and the opposite surface of the second lens portion 72 from the eyeball 22 is a concave with respect to the laser beam 34. Thus, the effect that converts the laser beam 34 to a convergent beam acts, and this also reduces the diffraction power of the diffraction element 74. The third reason is as follows. The laser beam 34 passes through the diffraction element 74 twice, and this also reduces the diffraction power of the diffraction element 74. Therefore, the decrease in the pitch interval of the diffraction element 74 is reduced, and this also eases the manufacture.

In FIG. 15A through FIG. 15C, the reflection film 78 is located on the opposite surface of the second lens portion 72 from the eyeball 22, and the laser beam 34 is reflected by the reflection film 78. However, this does not intend to suggest any limitation. As long as the laser beam 34 is reflected at the opposite surface of the second lens portion 72 from the eyeball 22, the reflection film 78 may not be located on the opposite surface of the second lens portion 72 from the eyeball 22.

When the light source 12 emits a laser beam of a single wavelength, a single diffraction element 74 is only required as illustrated in FIG. 15A through FIG. 16, but when a laser beam of different wavelengths (e.g., red, green, and blue laser beams) is emitted, the aforementioned configuration is not sufficient because the diffraction angle changes with respect to each wavelength as described above. In this case, the diffraction elements 74 each suitable for the corresponding one of the laser beams of different wavelengths may be stacked in the lens 20a.

In the fifth embodiment, the scanned light composed of the laser beam 34 that has been scanned by the scanning mirror 14 is projected onto the retina 26 of the eyeball 22 by the projection mirror 24a including the lens 20a, and the image is projected on the retina 26. However, this does not intend to suggest any limitation, and the projection device may be a projection device in which the laser beam emitted from a light source is projected onto the eyeball 22 by the projection mirror 24a including the lens 20a. For example, the present invention can be applied to a case where the laser beam is projected onto the retina or the iris of the eyeball for the eye examination or the eye treatment.

In the first through third embodiments, the light source 12 and the scanning mirror 14 are located outside the temple 10 of glasses, but may be located inside the temple 10 by widening the width of the temple 10 of glasses. In the first through third embodiments, the light source 12 is located in the temple 10 of glasses, but the light source 12 may be located separately from glasses as with in the fourth and fifth embodiments. In the fourth and fifth embodiments, the light source 12 may be located in the temple 10 of glasses as with in the first through third embodiments.

In the first through fifth embodiments, the scanning mirror 14 (e.g., a MEMS mirror) is employed as a scanning unit that two-dimensionally scans the laser beam, but other components such as potassium tantalate niobate (KTN) crystal, which is an electro-optical material, may be employed as long as it can two-dimensionally scan the laser beam. In the first through fifth embodiments, an image is projected onto the retina 26 of one eyeball 22, but the present invention can be applied to a case when an image is projected onto the retinas 26 of both eyeballs 22.

Although the desirable embodiments of the present invention has been described in detail, the present invention is not limited to a certain embodiment, and it should be understood that the various change, substitutions, and alterations could be made hereto without departing from the spirit and scope of the invention.

The invention claimed is:

1. An image projection device, comprising:
a light source that emits a laser beam; a scanner that two-dimensionally scans the laser beam emitted from the light source; and a projection mirror that projects scanned light onto a retina of an eyeball of a user to project an image onto the retina, the scanned light being composed of the laser beam that has been scanned by the scanner, wherein the laser beam emitted from the light source is scanned by using a part of an operating range of the scanner, wherein ranges in the projection mirror correspond to the operating range of the scanner regardless of which direction the user looks, and wherein when the user looks in a first direction, the scanned light enters the eyeball of the user by the scanner scanning the laser beam in a part region of the operating range of the scanner, and when the user looks in a second direction different from the first direction, the scanned light enters the eyeball of the user without changing a convergence point in the eyeball of the user and enters the eyeball of the user in a direction inclined in the second direction with respect to a direction in which the scanned light enters the eyeball of the user when the user looks in the first direction by the scanner scanning the laser beam in a region shifted from the part region of the operating range of the scanner.

2. The image projection device according to claim 1, wherein
the scanned light enters the projection mirror from a side of the eyeball of the user, the projection mirror being located in front of the eyeball of the user, and
the image projection device further comprises a controller that generates corrected image data by gradually decreasing height of an image of input image data from a first vertical side to a second vertical side opposite to the first vertical side and gradually increasing curvature toward the first vertical side of the image from the first vertical side to the second vertical side, and controls the light source to emit the laser beam based on the corrected image data, the first vertical side corresponding to a side at which the scanned light enters the projection mirror in a pair of vertical sides corresponding to a vertical direction of the projection mirror.

3. The image projection device according to claim 1, wherein
the scanned light enters the projection mirror from a side of the eyeball of the user, the projection mirror being located in front of the eyeball of the user,
a scanning amplitude of the scanner in a first direction corresponding to a vertical direction of the projection mirror gradually decreases in a second direction from a first side at which the laser beam enters the projection mirror to a second side opposite to the first side in a horizontal direction of the projection mirror by rotating the scanner of which a scanning amplitude in a horizontal direction gradually changes in a vertical direction to use the scanner, and
the image projection device further comprises a controller that generates corrected image data by rotating an image of input image data and gradually increasing curvature toward a first vertical side of the image from the first vertical side to a second vertical side opposite to the first vertical side, and controls the light source to emit the laser beam based on the corrected image data, the first vertical side corresponding to a side at which the scanned light enters the projection mirror in a pair of vertical sides corresponding to a vertical direction of the projection mirror.

4. The image projection device according to claim 1, wherein
the scanned light is converged at a side of the retina beyond a pupil of the eyeball of the user by the projection mirror.

5. The image projection device according to claim 1, wherein
the projection mirror has a compositional structure of a free curved surface and a diffraction surface.

6. The image projection device according to claim 1, further comprising:
an optical means that is located in a light path of the scanned light between the scanner and the projection mirror, and allows the laser beam in the scanned light to enter the projection mirror as a diverging beam, wherein the laser beam in the scanned light travels from the scanner in a direction away from the projection mirror, and is then reflected by the optical means to enter the projection mirror as a diverging beam.

7. The image projection device according to claim 6, wherein the laser beam in the scanned light projected by the projection mirror enters the eyeball as a light beam that is focused near the retina of the eyeball by a crystalline lens of the eyeball of the user.

8. The image projection device according to claim 1, wherein the projection mirror includes a lens of glasses located in front of the eyeball of the user, the lens includes a first lens portion and a second lens portion located in this order from a side of the eyeball of the user, and a diffraction element located between the first lens portion and the second lens portion, and the scanned light composed of the laser beam enters the first lens portion from the side of the eyeball of the user, and is then reflected at an opposite surface of the second lens portion from the eyeball of the user to be projected onto the retina of the eyeball of the user.

9. An image projection device, comprising:

a light source that emits a laser beam;

a scanner that two-dimensionally scans the laser beam emitted from the light source; and a projection mirror that has a free curved surface and projects scanned light onto a retina of an eyeball of a user to project an image onto the retina, the scanned light being composed of the laser beam that has been scanned by the scanner, wherein the scanned light enters the projection mirror from a side of the eyeball of the user, the projection mirror being located in front of the eyeball of the user, the image projection device further comprising a controller that generates corrected image data by gradually decreasing height of an image of input image data from a first vertical side to a second vertical side opposite to the first vertical side and gradually increasing curvature toward the first vertical side of the image from the first vertical side to the second vertical side, and controls the light source to emit the laser beam based on the corrected image data, the first vertical side corresponding to a side at which the scanned light enters the projection mirror in a pair of vertical sides corresponding to a vertical direction of the projection mirror.

10. The image projection device according to claim 9, wherein the scanned light is converged at a side of the retina beyond a pupil of the eyeball of the user by the projection mirror.

11. The image projection device according to claim 9, wherein the projection mirror has a compositional structure of the free curved surface and a diffraction surface.

12. The image projection device according to claim 9, further comprising:

an optical means that is located in a light path of the scanned light between the scanner and the projection mirror, and allows the laser beam in the scanned light to enter the projection mirror as a diverging beam, wherein the laser beam in the scanned light travels from the scanner in a direction away from the projection mirror, and is then reflected by the optical means to enter the projection mirror as a diverging beam.

13. The image projection device according to claim 12, wherein the laser beam in the scanned light projected by the projection mirror enters the eyeball as a light beam that is focused near the retina of the eyeball by a crystalline lens of the eyeball of the user.

14. The image projection device according to claim 9, wherein an optical unit that is located in a light path of the scanned light between the scanner and the projection mirror, and allows the laser beam in the scanned light to enter the projection mirror as a diverging beam, wherein the projection mirror converges scanned light near a pupil of the eyeball of the user, and then projects the scanned light onto the retina of the eyeball of the user to project the image onto the retina, and wherein the laser beam in the scanned light travels from the scanner in a direction away from the projection mirror, and is then reflected by the optical unit to enter the projection mirror as a diverging beam.

* * * * *